(12) United States Patent
Yamamoto et al.

(10) Patent No.: US 11,119,500 B1
(45) Date of Patent: Sep. 14, 2021

(54) MAGNETIC MARKER DETECTION SYSTEM AND MAGNETIC MARKER DETECTION METHOD

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 499 days.

(21) Appl. No.: 16/316,047

(22) PCT Filed: Jul. 6, 2017

(86) PCT No.: PCT/JP2017/024863
§ 371 (c)(1),
(2) Date: Jan. 8, 2019

(87) PCT Pub. No.: WO2018/012407
PCT Pub. Date: Jan. 18, 2018

(30) Foreign Application Priority Data

Jul. 11, 2016 (JP) .............................. JP2016-136904

(51) Int. Cl.
*G01B 7/14* (2006.01)
*G01B 7/30* (2006.01)
(Continued)

(52) U.S. Cl.
CPC ........... *G05D 1/0261* (2013.01); *G01B 7/003* (2013.01); *G01D 5/14* (2013.01); *G01D 5/142* (2013.01);
(Continued)

(58) Field of Classification Search
CPC .......... G01D 5/145; G01D 5/147; G01D 5/14; G01D 5/2451; G01D 5/142; G01D 5/20;
(Continued)

(56) References Cited

U.S. PATENT DOCUMENTS

2011/0184690 A1* 7/2011 Iida ........................ A61B 1/041
702/150
2015/0247719 A1 9/2015 Huang et al.
(Continued)

FOREIGN PATENT DOCUMENTS

CN 1262747 A 8/2000
CN 202600484 U 12/2012
(Continued)

OTHER PUBLICATIONS

International Search Report and Written Opinion for International Application No. PCT/JP2017/024863, dated Sep. 19, 2017 with English-language Translation.

*Primary Examiner* — Raul J Rios Russo
(74) *Attorney, Agent, or Firm* — Xsensus LLP

(57) ABSTRACT

A magnetic marker detection system (1), for detecting, by using sensor units (11) disposed in at least two places separated from each other in a longitudinal direction of a vehicle (5), a magnetic marker (10) disposed in a traveling path, sets, when a magnetic marker has been detected by a front side sensor unit (11), a predetermined period including a predicted point of time of detection of the magnetic marker (10) by a rear side sensor unit (11) and makes, when the rear-side sensor unit (11) has successfully detected the magnetic marker (10) during the predetermined period, a determination that the magnetic marker (10) has been detected.

20 Claims, 11 Drawing Sheets

(51) Int. Cl.
*G05D 1/02* (2020.01)
*G01B 7/00* (2006.01)
*G01D 5/14* (2006.01)
*G01D 5/245* (2006.01)
*G01D 5/20* (2006.01)

(52) U.S. Cl.
CPC ............ *G01D 5/145* (2013.01); *G01D 5/147* (2013.01); *G01D 5/20* (2013.01); *G01D 5/2451* (2013.01); *G01B 7/30* (2013.01); *G05D 2201/0213* (2013.01)

(58) Field of Classification Search
CPC ........ G01B 7/003; G01B 7/30; G05D 1/0261; G05D 2201/0213
USPC .................. 324/51, 55, 200, 207.11, 207.22
See application file for complete search history.

(56) References Cited

U.S. PATENT DOCUMENTS

| | | | | |
|---|---|---|---|---|
| 2018/0283904 | A1* | 10/2018 | Yamamoto | ............ B62D 15/025 |
| 2020/0320870 | A1* | 10/2020 | Yamamoto | ............. G08G 1/042 |

FOREIGN PATENT DOCUMENTS

| | | | |
|---|---|---|---|
| CN | 103499351 | A | 1/2014 |
| JP | H01-240911 | A | 9/1989 |
| JP | H06-119034 | A | 4/1994 |
| JP | 2005-202478 | A | 7/2005 |

* cited by examiner

[FIG. 1]
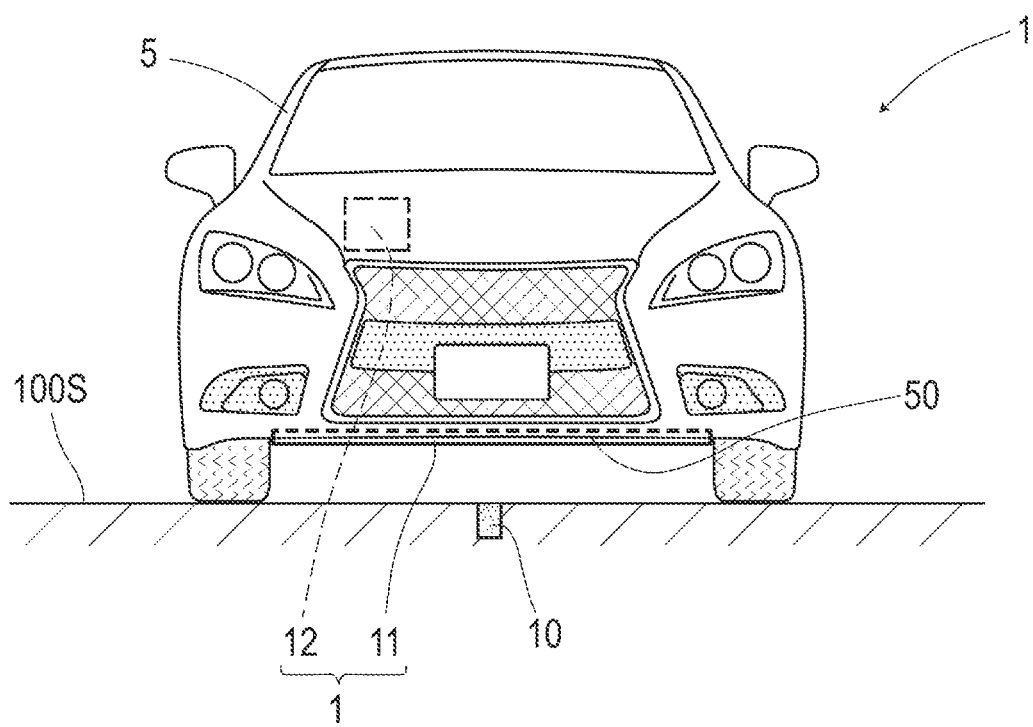

[FIG. 2]
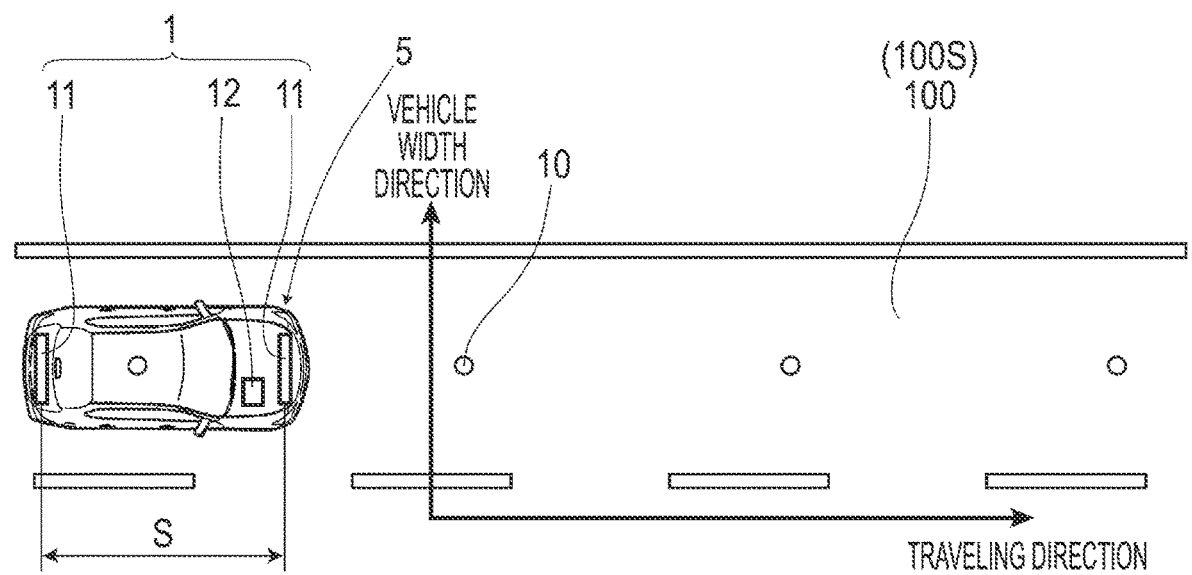

[FIG. 3]
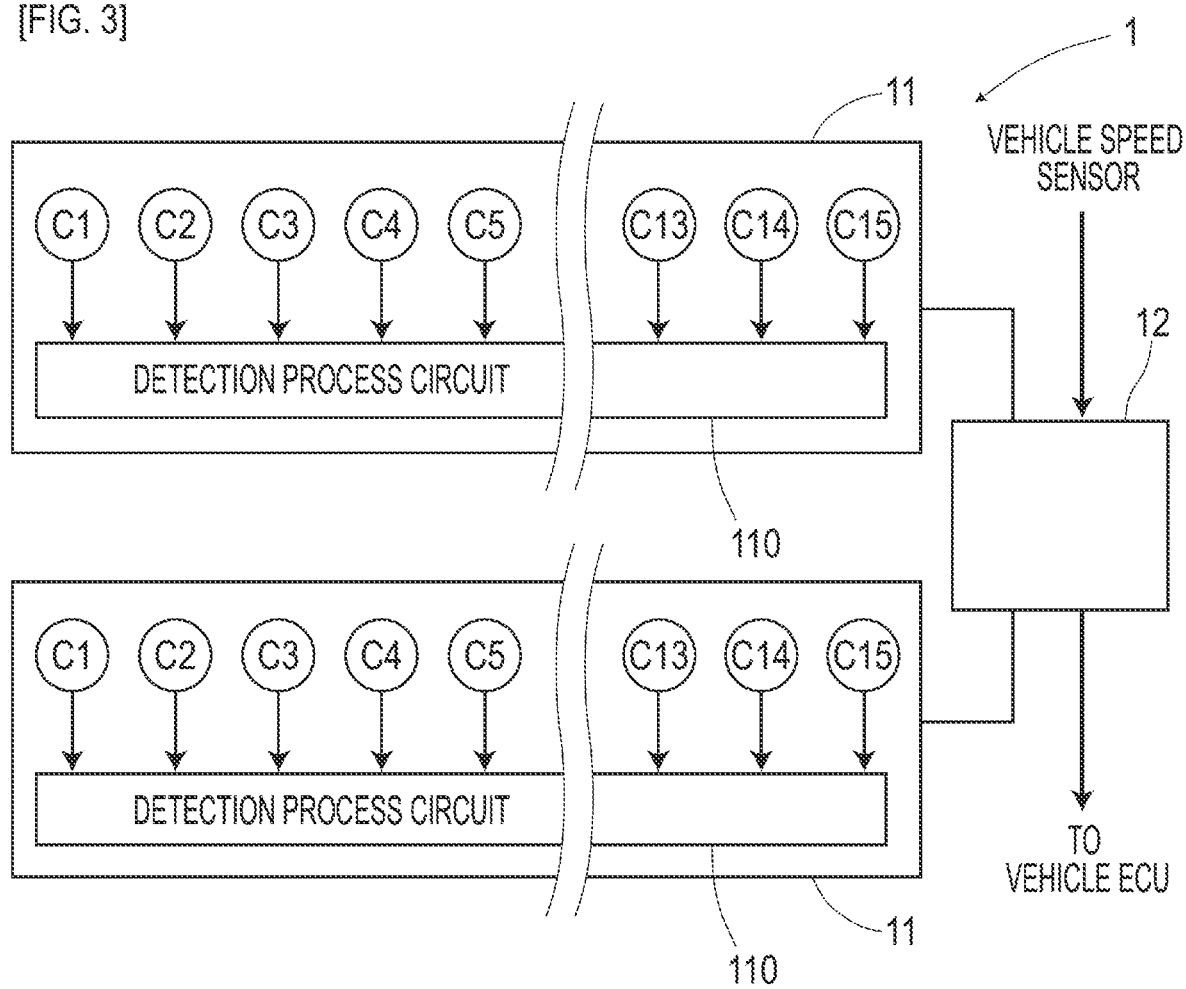

[FIG. 4]
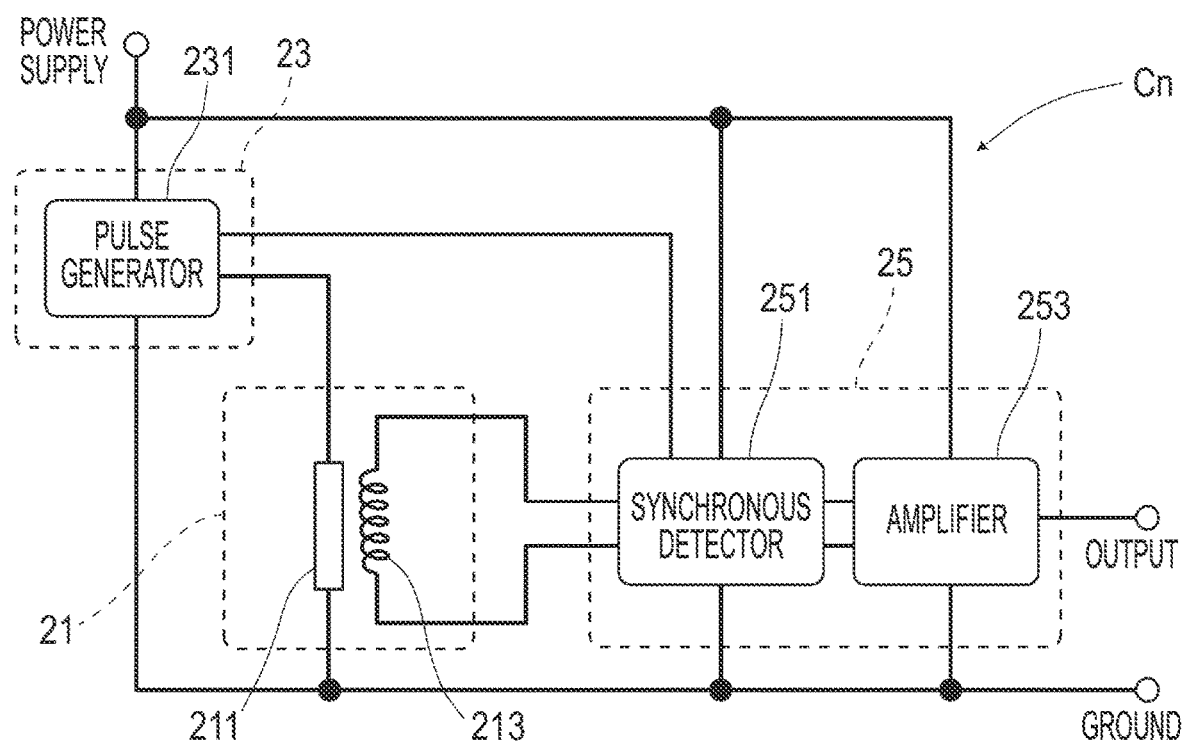

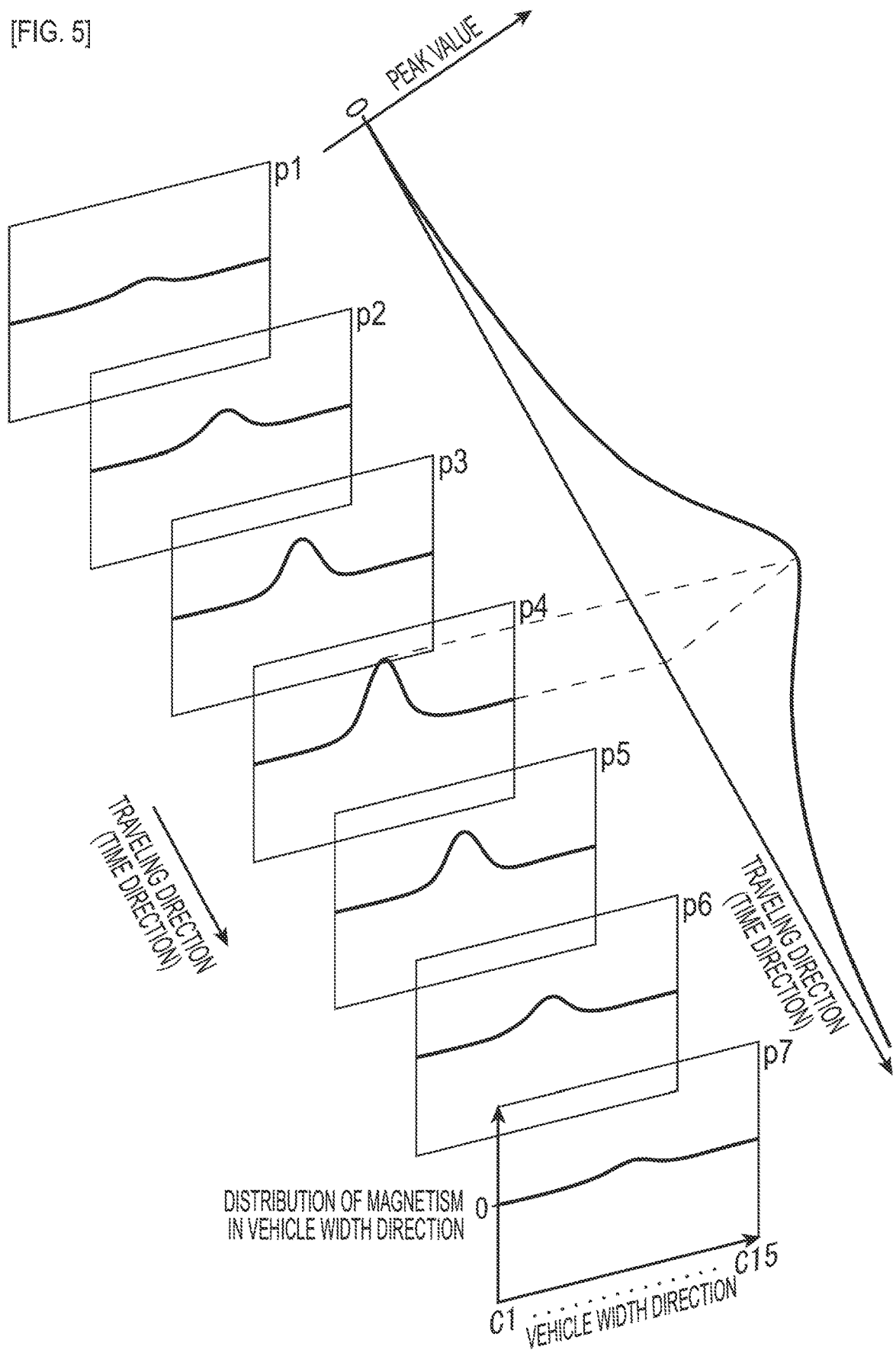
[FIG. 5]

[FIG. 6]
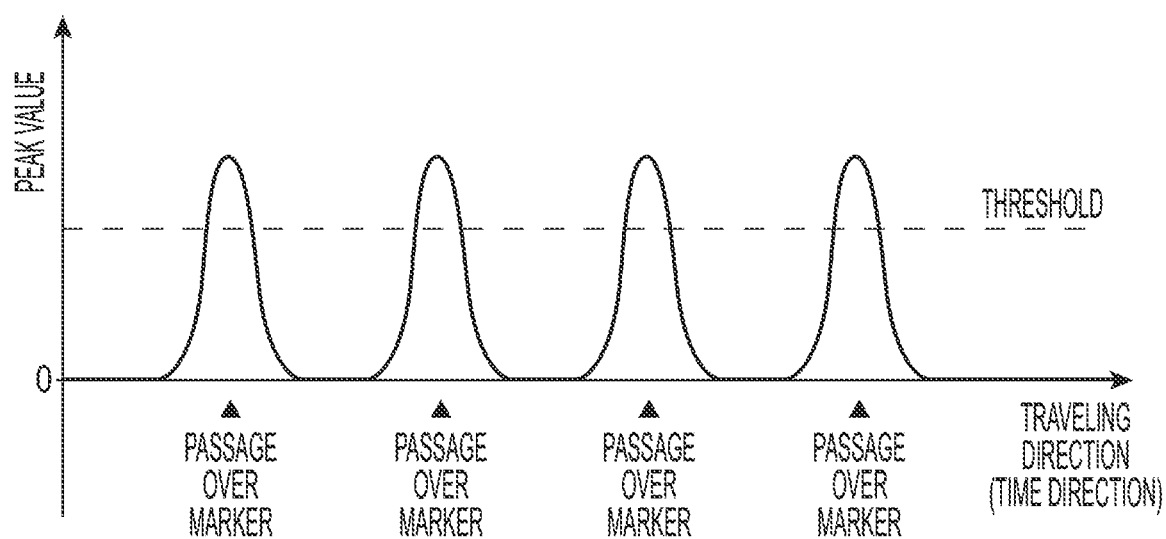

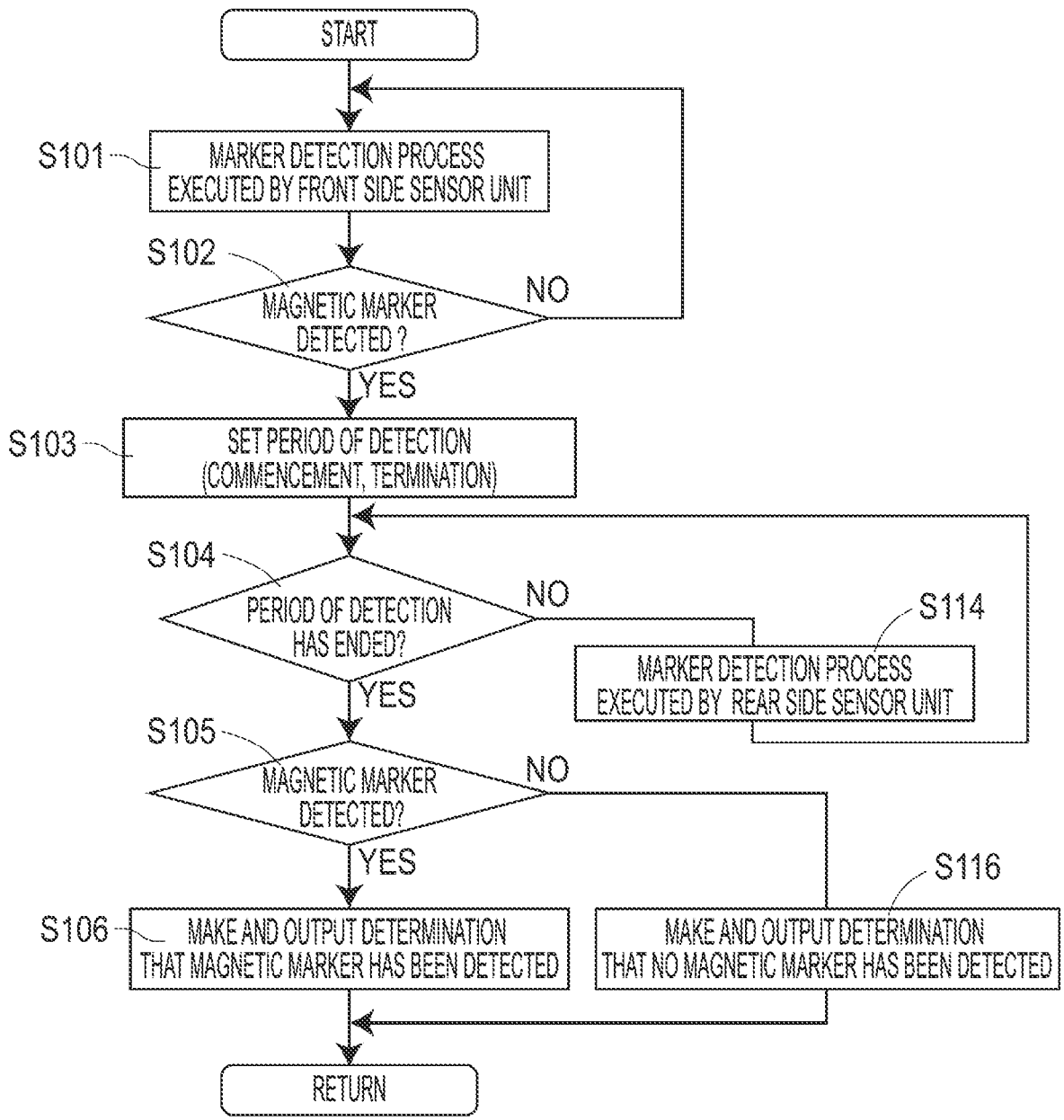
[FIG. 7]

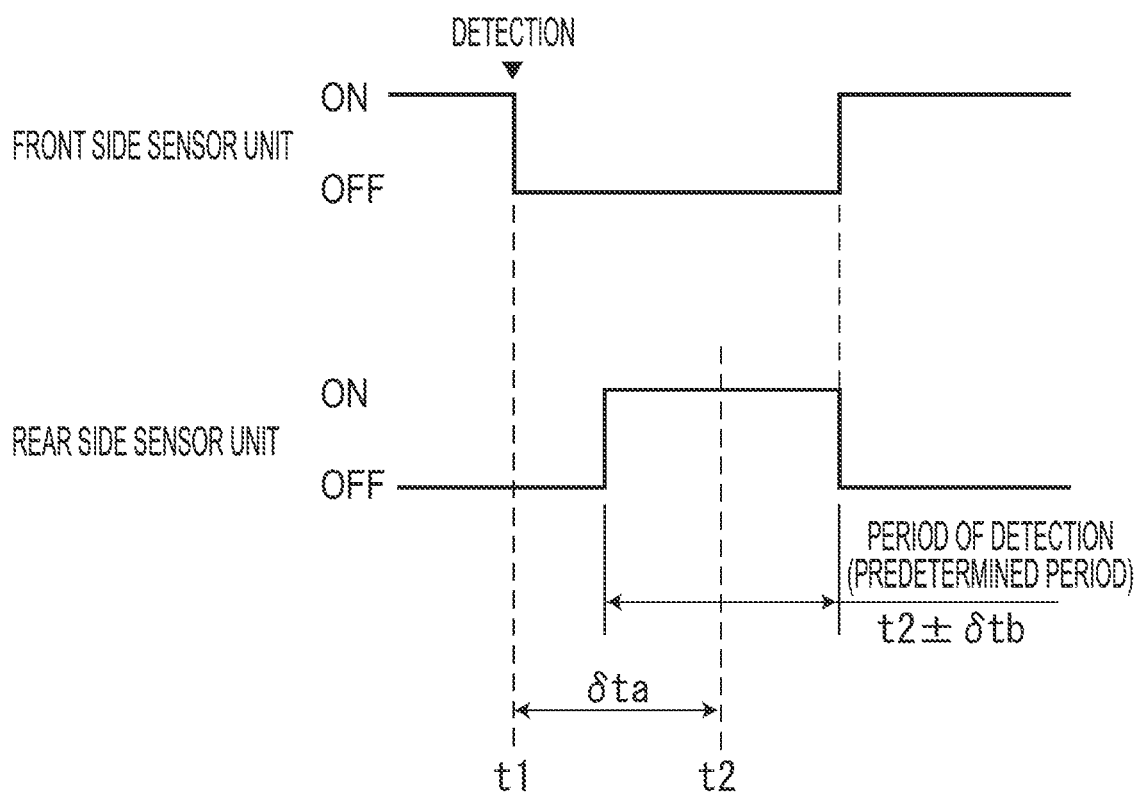

[FIG. 9]
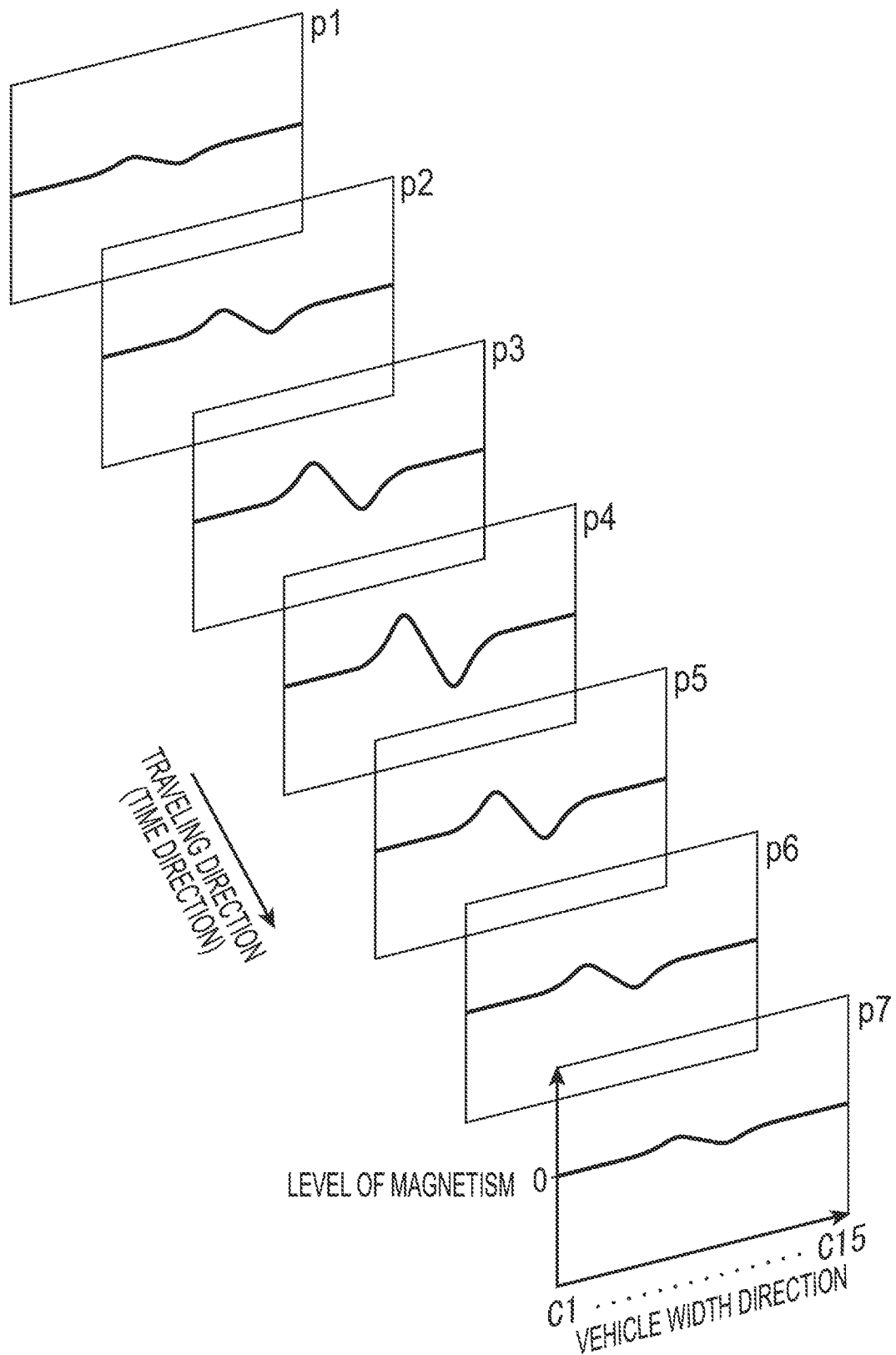

[FIG. 10]
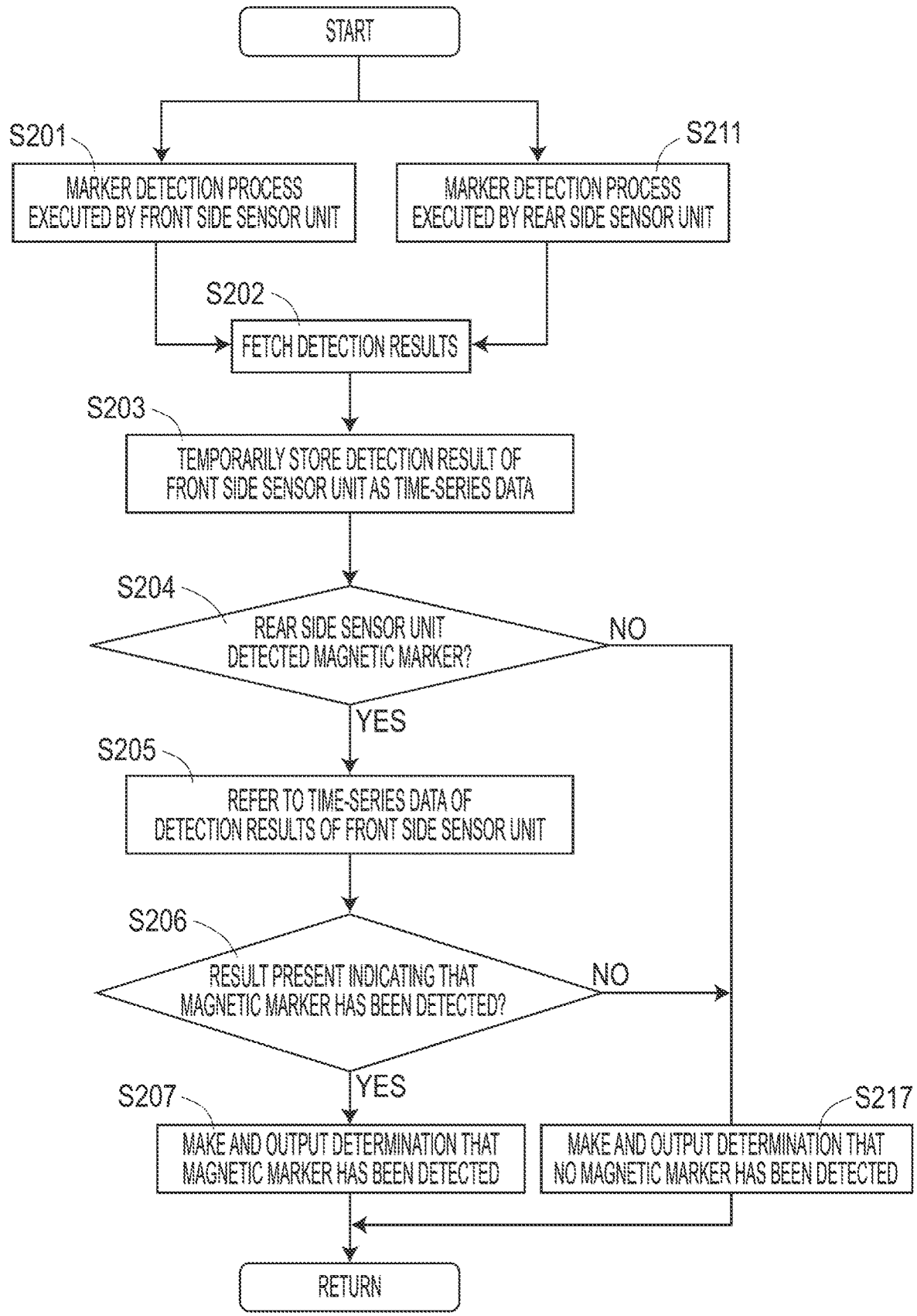

[FIG. 11]
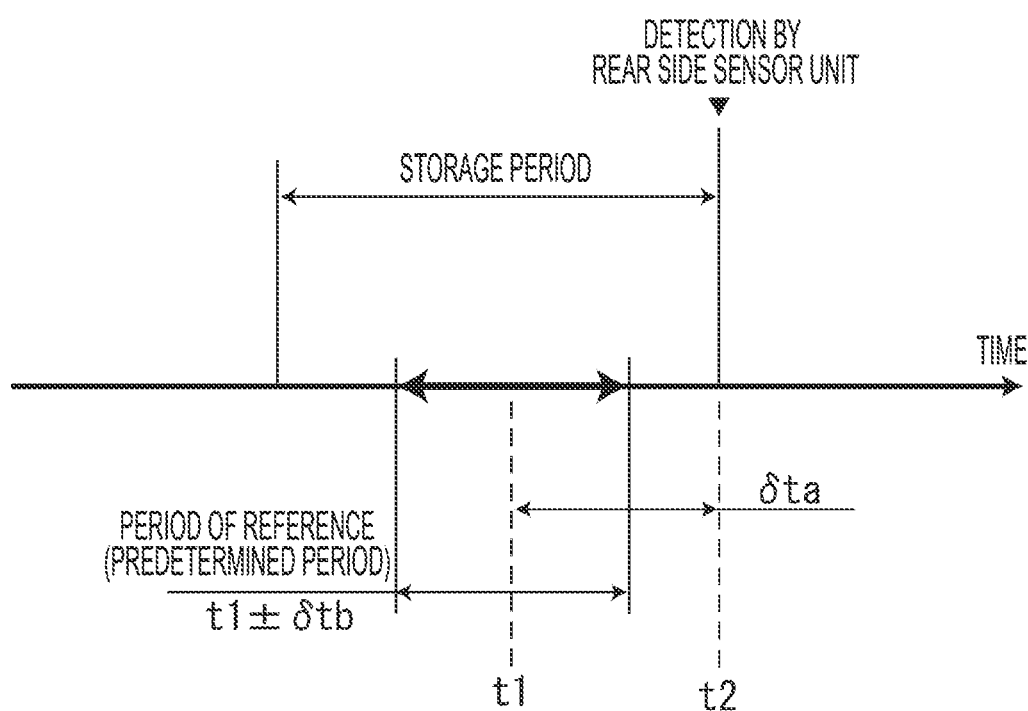

MAGNETIC MARKER DETECTION SYSTEM AND MAGNETIC MARKER DETECTION METHOD

CROSS-REFERENCE TO RELATED APPLICATIONS

This application is a National Stage Application based on PCT/JP2017/024863, filed on Jul. 6, 2017, and claims priority to Japanese Patent Application No. 2016-136904, filed on Jul. 11, 2016, the entire contents of which being incorporated herein by reference.

TECHNICAL FIELD

The present invention relates to a magnetic marker detection system and a magnetic marker detection method for detecting magnetic markers laid in a road.

BACKGROUND ART

Conventionally, there has been known a vehicular magnetic marker detection system in which magnetic markers laid in a road are used for vehicle control (see, for example, Patent Literature 1). Being able to use such a magnetic marker detection system, for example, to detect, with a magnetic sensor or the like of a vehicle, magnetic markers laid along a lane makes it possible to achieve various types of drive assist such as automatic steering control, lane departure warning, and automatic driving.

CITATION LIST

Patent Literature

Patent Literature 1: JP 2005-202478

SUMMARY OF INVENTION

Technical Problem

However, the conventional magnetic marker detection system has the following problem. That is, due to various kinds of disturbance magnetism acting on the magnetic sensor or the like, reliability of detection of the magnetic markers may be impaired. For example, a vehicle that runs side by side with the vehicle and a vehicle that passes by the vehicle can be a generation source of disturbance magnetism.

The present invention was made in view of the above-described conventional problem to provide a magnetic marker detection method and magnetic marker detection system with high reliability of detection.

Solution to Problem

One aspect of the present invention is directed to a magnetic marker detection system for detecting, by using marker detection units provided in at least two places separated from each other in a longitudinal direction of a vehicle, magnetic markers disposed in a traveling path, including:

a determination process part that executes a process for, on the basis of at least either a detection result of a magnetic marker yielded by a front side marker detection unit or a detection result of a magnetic marker yielded by a rear side marker detection unit, making a determination as to whether a magnetic marker has been detected, wherein in the determination process part, detection, within a predetermined period based on a point of time of detection of a magnetic marker by a first one of the front side and rear side marker detection units, of the magnetic marker by a second one of the marker detection units is set as a condition for making a determination that the magnetic marker has been detected.

One aspect of the present invention is directed to a magnetic marker detection method for detecting, by using marker detection units provided in at least two places separated from each other in a longitudinal direction of a vehicle, magnetic markers disposed in a traveling path, including:

a first detection step in which a front side marker detection unit executes a magnetic marker detection process;

a period setting step of, when a magnetic marker has been detected by the front side marker detection unit, predicting, on the basis of the point of time of detection, a point of time of possible detection of the same magnetic marker by a rear side marker detection unit and setting a predetermined period including the point of time of possible detection; and a second detection step in which the rear side marker detection unit executes a magnetic marker detection process during the predetermined period set in the period setting step.

Advantageous Effects of Invention

A magnetic marker detection system according to the present invention is a system that improves the accuracy of detection of a magnetic marker by using marker detection units disposed in at least two places separated from each other in a longitudinal direction of a vehicle. In this magnetic marker detection system, detection, within a predetermined period based on a point of time of detection of a magnetic marker by a first one of the front side and rear side marker detection units, of the same magnetic marker by a second one of the marker detection units is set as a condition for surely determining detection of the magnetic marker. Therefore, even in a case where there has occurred false detection at either the front side marker detection unit or the rear side marker detection unit, an erroneous determination that a magnetic marker has been detected is not immediately made.

In a magnetic marker detection method according to the present invention, the rear side marker detection unit executes a magnetic marker detection process during a predetermined period set upon detection of a magnetic marker by the front side marker detection unit. Therefore, even if false detection occurs at the front side marker detection unit, the false detection is not immediately finalized. Further, the rear side marker detection unit has a lower possibility of occurrence of false detection, as it executes a detection process when a magnetic marker has been detected by the front side marker detection unit. Even in a case where there has occurred false detection at the front side magnetic sensor, it is possible to make a judgment that a detection result yielded by the front side magnetic sensor is wrong or low in reliability, unless the rear side magnetic sensor detects a magnetic marker during the predetermined period set upon the false detection.

Thus, the magnetic marker detection system and the magnetic marker detection method according to the present invention are a system and a method that detect a magnetic marker with high reliability.

BRIEF DESCRIPTION OF DRAWINGS

FIG. 1 is a front view depicting a vehicle having a sensor unit attached thereto according to Embodiment 1;

FIG. 2 is a configuration diagram of a magnetic marker detection system according to Embodiment 1;

FIG. 3 is a block diagram depicting an electrical configuration of the magnetic marker detection system according to Embodiment 1;

FIG. 4 is a block diagram depicting a configuration of a magnetic sensor according to Embodiment 1;

FIG. 5 is a descriptive diagram illustrating temporal changes in distribution of magnetism in a vehicle width direction during passage over magnetic markers according to Embodiment 1;

FIG. 6 is a descriptive diagram illustrating temporal changes in peak value of magnetic measurement values during passage over magnetic markers according to Embodiment 1;

FIG. 7 is a flow chart depicting the flow of a process that is performed by the magnetic marker detection system according to Embodiment 1;

FIG. 8 is a descriptive diagram of a period of detection by a rear side sensor unit according to Embodiment 1;

FIG. 9 is a descriptive diagram illustrating temporal changes in gradient of magnetism in the vehicle width direction during passage over magnetic markers according to Embodiment 1;

FIG. 10 is a flow chart depicting the flow of a process that is performed by a magnetic marker detection system according to Embodiment 2; and FIG. 11 is a descriptive diagram of a predetermined period according to Embodiment 2.

DESCRIPTION OF EMBODIMENTS

The following describes preferred aspects of the present invention.

In the magnetic marker detection system of the present invention, detection, within a predetermined period based on a point of time of detection of a magnetic marker by a first one of the front side and rear side marker detection units, of the same magnetic marker by a second one of the marker detection units is set as a condition for making a determination that the magnetic marker has been detected. This predetermined period is either a past period or a future period with respect to a reference point of time, depending on whether the first marker detection unit is the front side marker detection unit or the rear side marker detection unit. In a case where the first marker detection unit is the front side marker detection unit, the predetermined period is a future period with respect to the reference point of time. On the other hand, in a case where the first marker detection unit is the rear side marker detection unit, the predetermined period is a past period with respect to the reference point of time.

The magnetic marker detection system of the present invention may be a system including a period setting part that, when the front side marker detection unit has detected a magnetic marker, executes a process for setting, as the predetermined period, a time period including a predicted point of time of detection of the same magnetic marker by the rear side marker detection unit.

In this case, when the front side marker detection unit has detected a magnetic marker, whether the detection of the magnetic marker by the front side marker detection unit is right or wrong can be confirmed according to whether the rear side marker detection unit has successfully detected the magnetic marker during the predetermined period.

The rear side marker detection unit may execute a magnetic marker detection process during the predetermined period.

In this case, by the rear side marker detection unit executing a detection process during the predetermined period, whether the detection of the magnetic marker by the front side marker detection unit is right or wrong can be efficiently confirmed.

In the magnetic marker detection system of the present invention, either of the front side or rear side marker detection units may selectively execute a magnetic marker detection process, and while the rear side marker detection unit may execute a detection process during the predetermined period, the front side marker detection unit may execute a detection process during other periods of operation.

In a case where either of the front side or rear side marker detection units selectively executes the magnetic marker detection process, the load of arithmetic processing on the whole system can be reduced. Further, without the need to execute detection processes in parallel, hardware can be configured on a small scale, and hardware cost can be reduced.

The predetermined period may vary in length according to a vehicle speed that is a velocity of the vehicle, and the predetermined period may become a shorter period as the vehicle speed becomes higher.

If each of the marker detection units has a certain detection range, the time required for a magnetic marker to pass through the detection range becomes shorter as the vehicle speed becomes higher. If the predetermined period is constant regardless of the vehicle speed, the proportion of time, during which a magnetic marker is located in the detection range of the marker detection unit and can be detected, in the predetermined period varies according to the vehicle speed. As the vehicle speed becomes higher, this proportion becomes lower and the likelihood of occurrence of false detection becomes higher.

Accordingly, making the predetermined period shorter as the vehicle speed becomes higher as noted above makes it possible to increase the proportion of time, during which a magnetic marker is located in the detection range of the marker detection unit, in the predetermined period. This makes it possible to reduce the number of tries to execute a detection process when no magnetic marker is located in the detection range during the predetermined period, thus making it possible to prevent false detection from occurring.

The marker detection units may be able to detect lateral shift amounts of the vehicle relative to a magnetic marker, and the determination process part may be configured to, by using indices regarding a magnetic marker, make a determination as to whether a magnetic marker has been detected, and the indices may include a variation that is a difference between a first lateral shift amount detected by the front side marker detection unit and a second lateral shift amount detected by the rear side marker detection unit.

In this case, false detection can be discovered according to whether a variation between the lateral shift amounts during passage of the vehicle over a magnetic marker is appropriate. For example, even in a case where both the front side marker detection unit and the rear side marker detection unit have detected a magnetic marker but the lateral shift amounts are excessive, it is possible to make a judgment that a determination that a magnetic marker has been detected is not high in reliability or is based on false detection.

In the magnetic marker detection method according to the present invention, the first detection step may be repeatedly executed until a magnetic marker is detected by the front side marker detection unit.

In this case, there is no longer the need to uselessly execute the period setting step or the second detection step, so that it becomes possible to efficiently use hardware resources.

EMBODIMENTS

Embodiments of the present invention are described in concrete terms with reference to the following examples.

Embodiment 1

Embodiment 1 is an example directed to a magnetic marker detection method and a magnetic marker detection system 1 for detecting magnetic markers 10 laid in a road. This content is described with reference to FIG. 1 to FIG. 9.

As depicted in FIG. 1 to FIG. 3, the magnetic marker detection system 1 is a vehicle-side system for detecting magnetic markers 10 laid in a road (traveling path), and is configured by a combination of a sensor unit (marker detection unit) 11 including magnetic sensors Cn (where n represents integers of 1 to 15) and a detection unit 12 that controls the sensor unit 11. The following briefly describes the magnetic markers 10 and then describes the sensor unit 11 and detection unit 12 of the magnetic marker detection system 1.

The magnetic markers 10 are road markers that are laid in a road surface 100S so as to be lined up along the center of a lane 100 along which a vehicle 5 travels. Each of the magnetic markers 10 has a columnar shape measuring 20 mm in diameter and 28 mm in height, and can be accommodated in a hole provided in the road surface 100S. A magnet forming each of the magnetic markers 10 is a ferrite plastic magnet formed by dispersing a magnetic powder of iron oxide as a magnetic material in a polymer material as a base material, and has a characteristic of a maximum energy product (BHmax)=6.4 kJ/m$^3$. Each of the magnetic markers 10 is laid in a state of having been accommodated in a hole bored in the road surface 100S.

Table 1 depicts a part of the specifications of the magnetic marker 10 according to Embodiment 1.

TABLE 1

| Type of magnet | Ferrite plastic magnet |
| --- | --- |
| Diameter | φ 20 mm |
| Height | 28 mm |
| Magnetic flux density GS of the surface | 45 mT |

The magnetic marker 10 can effect magnetism of a magnetic flux density of 8 µT ($8 \times 10^{-6}$ T, T: tesla) at an upper-limit height of 250 mm of a possible range of 100 to 250 mm of the height of attachment of magnetic sensors Cn.

The following describes the sensor unit 11 and detection unit 12 of the magnetic marker detection system 1.

As depicted in FIG. 1 and FIG. 2, the sensor unit 11 is a unit that is attached to a vehicle body floor 50 that is equivalent to a bottom surface of the vehicle 5. The magnetic marker detection system 1 has such sensor units 11 placed in two places separated from each other in a longitudinal direction of the vehicle 5. Further, the following description assumes that the spacing between the front side sensor unit 11 and the rear side sensor unit 11 in the longitudinal direction of the vehicle is a sensor span S.

The front side sensor unit 11 is attached near the inside of a front bumper, and the rear side sensor unit 11 is attached near the inside of a rear bumper. In the case of the vehicle according to Embodiment 1, the sensor units 11 are both attached at a height of 200 mm above the road surface 100S.

As depicted in FIG. 2 and FIG. 3, each of the sensor units 11 includes fifteen magnetic sensors Cn aligned in a straight line along a vehicle width direction and a detection process circuit 110 containing a CPU (not illustrated) and the like.

The detection process circuit 110 (FIG. 3) is an arithmetic circuit that executes various types of arithmetic processing such as a marker detection process (detection process) for detecting a magnetic marker 10. The detection process circuit 110 is configured by a CPU (central processing unit) that executes various types of operation and elements such as memory elements such as a ROM (read-only memory) and a RAM (random-access memory).

The detection process circuit 110 executes the marker detection process and the like by acquiring sensor signals that are outputted from the respective magnetic sensors Cn. Results of detection of magnetic markers 10 as computed by the detection process circuit 110 are all inputted to the detection unit 12. It should be noted that the front side and rear side sensor units 11 are each able to execute the marker detection process with a period of 3 kHz.

The configuration of each of the magnetic sensors Cn is described here. As depicted in FIG. 4, each of the magnetic sensors Cn employed in Embodiment 1 is a single-chip MI sensor obtained by integrating an MI element 21 and a drive circuit. The MI element 21 is an element including a substantially zero-magnetostrictive amorphous wire 211 made of a CoFeSiB-based alloy and a pickup coil 213 wound around the amorphous wire 211. The magnetic sensor Cn measures a voltage that is generated in the pickup coil 213 when a pulse current is applied to the amorphous wire 211, thereby detecting magnetism that acts on the amorphous wire 211. The MI element 21 has detection sensitivity in an axial direction of the amorphous wire 211, which is a magneto-sensitive body. In each of the magnetic sensors Cn of the sensor unit 11 according to Embodiment 1, the amorphous wire 211 is disposed along a vertical direction.

The drive circuit is an electronic circuit including a pulse circuit 23 that supplies a pulse current to the amorphous wire 211 and a signal processing circuit 25 that samples and outputs, at predetermined timings, a voltage generated in the pickup coil 213. The pulse circuit 23 is a circuit including a pulse generator 231 that generates a pulse signal which is abase signal of a pulse current. The signal processing circuit 25 is a circuit that takes out an induced voltage of the pickup coil 213 via a synchronous detector 251 that is opened and closed in tandem with a pulse signal and amplifies the induced voltage by a predetermined amplification factor with an amplifier 253. A signal amplified by the signal processing circuit 25 is outputted as a sensor signal to the outside.

The magnetic sensor Cn is a high-sensitivity sensor having a magnetic flux density falling within a measuring range of ±0.6 mT and a magnetic flux resolution of 0.02 µT in the measuring range. Such high sensitivity is achieved by the MI element 21 using an MI effect by which the impedance of the amorphous wire 211 sensitively varies according to an external magnetic field. Furthermore, the magnetic sensor Cn is capable of high-speed sampling with a period of 3 kHz, and is also compatible with high-speed traveling of a vehicle. In Embodiment 1, the period of magnetic measurement by the sensor unit 11 is set at 3 kHz. The sensor unit 11 inputs a sensor signal to the detection unit 12 every time a magnetic measurement is performed.

Table 2 depicts a part of the specifications of a magnetic sensor Cn.

TABLE 2

| Measuring range | ±0.6 mT |
| --- | --- |
| Magnetic flux resolution | 0.02 µT |
| Sampling period | 3 kHz |

As noted above, the magnetic marker 10 can effect magnetism of a magnetic flux density of 8 µT ($8 \times 10^{-6}$ T) or higher in a possible range of 100 to 250 mm of the height of attachment of the magnetic sensor Cn. A magnetic marker 10 that effects magnetism of a magnetic flux density of 8 µT or higher is detectable with high reliability using a magnetic sensor Cn with a magnetic flux resolution of 0.02 µT.

As depicted in FIG. 1 to FIG. 3, the detection unit 12 is a unit that controls the front side and rear side sensor units 11 and that determines a final detection result on the basis of detection results yielded by the respective sensor units 11 and outputs the final detection result. Electrically connected to the detection unit 12 are a vehicle speed sensor, a vehicle ECU, and the like, as well as the front side and rear side sensor units 11. The detection result that the detection unit 12 outputs is inputted to the vehicle ECU (not illustrated) and is used for various types of control on the vehicle side, such as automatic steering control, lane departure warning, and automatic driving for lane keeping.

The detection unit 12 includes an electronic substrate (not illustrated) mounted with memory elements such as a ROM and a RAM, as well as a CPU that executes various types of operation. The detection unit 12 controls the operation of the front side sensor unit 11 and the rear side sensor unit 11, determines a final detection result by consolidating detection results yielded by the respective sensor units 11, and outputs the final detection result.

The detection unit 12 functions as each of the following parts:

(a) Determination process part: on the basis of at least either a detection result yielded by the front side sensor unit 11 or a detection result yielded by the rear side sensor unit 11, makes a determination as to whether a magnetic marker 10 has been detected.

(b) Period setting part: when the front side sensor unit 11 has detected a magnetic marker 10, predicts a point of time of possible detection of the same magnetic marker 10 by the rear side sensor unit 11 and sets, as a period of detection (predetermined period), a time period including the point of time of possible detection.

The following describes (1) Marker Detection Process by which each sensor unit 11 detects a magnetic marker 10 and then describes the flow of (2) Overall Operation of Magnetic Marker Detection System 1.

(1) Marker Detection Process

The front side and rear side sensor units 11 each execute the marker detection process with a period of 3 kHz during the after-mentioned period designated by the detection unit 12. Each of the sensor units 11 acquires a distribution of magnetism in the vehicle width direction by sampling magnetic measurement values represented by sensor signals from the fifteen magnetic sensors Cn every period of execution (p1 to p7) of the marker detection process (see FIG. 5). As depicted in FIG. 5, the peak value of the distribution of magnetism in the vehicle width direction reaches its maximum during passage over a magnetic marker 10 (period p4 in FIG. 5).

As depicted in FIG. 6, when the vehicle 5 travels along the lane 100 laid with the magnetic markers 10, the peak value of the distribution of magnetism in the vehicle width direction becomes higher every time the vehicle 5 passes over a magnetic marker 10. In the marker detection process, a threshold judgment as to this peak value is executed, and in the case of a predetermined threshold or larger, it is judged that a magnetic marker 10 has been detected.

It should be noted that when having detected a magnetic marker 10, the sensor unit 11 identifies which of the magnetic sensors Cn has yielded a magnetic measurement value that serves as the peak value. Then, a positional shift amount of the magnetic sensor thus identified in the vehicle width direction with respect to the center of the sensor unit 11 is detected as a lateral shift amount of the vehicle 5 with respect to the magnetic marker 10. It should be noted that the accuracy of the lateral shift amount can be further improved by curve-fitting the distribution of magnetism in the vehicle width direction and identifying the position of the peak value with finer accuracy than the spacing between adjacent ones of the fifteen magnetic sensors.

(2) Overall Operation of Magnetic Marker Detection System 1

Overall operation of the magnetic marker detection system 1 is described with reference to the flow chart of FIG. 7, with the detection unit 12 used mainly as a subject.

The detection unit 12 operates the front side sensor unit 11 to execute the above-described marker detection process (S101, first detection step), and operates the front side sensor unit 11 to repeatedly execute the above-described marker detection process until the front side sensor unit 11 detects a magnetic marker 10 (S102: NO). Upon receiving an input from the front side sensor unit 11 to the effect that a magnetic marker 10 has been detected (S102: YES), the detection unit 12 sets a period of detection that is a time period during which the detection unit 12 operates the rear side sensor unit 11 to execute the marker detection process (S103, period setting step).

Specifically, as depicted in FIG. 8, first, the detection unit 12 adds, to a time t1 that is a point of time of detection of the magnetic marker 10 by the front side sensor unit 11, the time required δta obtained by dividing the sensor span S (m) by the vehicle speed (velocity of the vehicle) V (m/s) measured by the vehicle speed sensor. By thus adding the time required δta to the time t1, a time t2 that is a point of time of possible detection of the magnetic marker 10 by the rear side sensor unit 11 can be predicted. Then, the detection unit 12 sets, as a period of detection, a time interval whose commencement is a time (t2−δtb) obtained by subtracting, from the time t2, an interval time δtb obtained by dividing a reference distance of 1 (m) by the vehicle speed V (m/s) and whose termination is a time (t2+δtb) obtained by adding the interval time δtb to the time t2. It should be noted that the reference distance can be varied as appropriate in consideration of the detection range or the like of the sensor unit 11.

The detection unit 12 operates the rear side sensor unit 11 to repeatedly execute the marker detection process during the period of detection of FIG. 8 (S104: NO→S114, second detection step). The content of this magnetic marker detection process is the same as that of the magnetic marker detection process executed by the front side sensor unit 11 in step S101. When the period of detection ends (S104: YES), the detection unit 12 makes and outputs, according to whether the rear side sensor unit 11 has successfully detected the magnetic marker 10 (S105), a determination as to whether the magnetic marker 10 has been detected (S106, S116).

When the rear side sensor unit 11 has successfully detected the magnetic marker 10 during the period of detection (FIG. 8) (S105: YES) after the detection of the magnetic marker 10 by the front side sensor unit 11 (S102: YES), the detection unit 12 determines that the magnetic marker 10 has been detected and outputs the determination to the vehicle ECU or the like (S106). It should be noted that when the rear side sensor unit 11 has detected the magnetic marker 10, the detection unit 12 may proceed to the above-described step S106 without waiting for the period of detection to end.

On the other hand, in a case where the rear side sensor unit 11 has failed to detect the magnetic marker 10 during the period of detection (FIG. 8) (S105: NO) although the front side sensor unit 10 has detected the magnetic marker 10 (S102: YES), the detection unit 12 makes, as a final determination, a determination that the magnetic marker 10 has not been detected, and outputs the determination (S116).

According to the magnetic marker detection system 1 thus configured, even in a case, for example, where the front side sensor unit 11 has falsely detected a magnetic marker 10, it does not immediately lead to false detection. This is because detection of a magnetic marker 10 by the front side sensor unit 11 only serves as a trigger for the rear side sensor unit 11 to execute the marker detection process.

In the magnetic marker detection system 1, detection of a magnetic marker 10 by the rear side sensor unit 11 within a period of detection (predetermined period) based on a point of time of detection of the magnetic marker 10 by the front side sensor unit 11 is a condition for making a determination that the magnetic marker 10 has been detected. When this condition is satisfied, a determination is made that the magnetic marker 10 has been detected. Since the rear side sensor unit 11 executes the marker detection process only in a case where the front side sensor unit 11 has detected a magnetic marker 10, a possibility of false detection is low.

Thus, the magnetic marker detection system 1 executes the marker detection process with a slight shift in timing by using the plurality of sensor units 11. Moreover, when the plurality of sensor units 11 have successfully detected a magnetic marker 10 that is highly possible to be identical, a determination is made that the magnetic marker 10 has been detected. In the magnetic marker detection system 1, detection reliability is improved by the plurality of sensor units 11 each executing the marker detection process.

Although Embodiment 1 has illustrated a configuration in which the front side and rear side sensor units 11 execute marker detection processes, a configuration may alternatively be employed in which all sensor signals from the respective magnetic sensors Cn are taken into the detection unit 12 and the detection unit 12 executes all processes. During operation of the magnetic marker detection system 1, either of the front side or rear side sensor units 11 is selectively executing the marker detection process. While the rear side sensor unit 11 executes the marker detection process during the period of detection, the front side sensor unit 11 executes the marker detection process during other periods of system operation. While the magnetic marker detection system 1 includes the two sensor units 11, the two sensor units 11 do not execute marker detection processes at the same time. It is therefore possible to easily employ a configuration in which all sensor signals from the respective magnetic sensors Cn are taken into the detection unit 12 and the detection unit 12 executes all processes. Employing such a configuration makes it possible to reduce the scale of hardware and reduce cost.

In the magnetic marker detection system 1, the length of the period of detection (FIG. 8), during which the rear side sensor unit 11 executes the marker detection process, varies according to the vehicle speed. The length of this period of detection becomes shorter as the vehicle speed becomes higher, and becomes longer as the vehicle speed becomes lower. Employing such a configuration makes it possible to prevent an occurrence of false detection by reducing the proportion of time, during which no magnetic marker 10 is located in the detection range of the rear side sensor unit 11, in the period of detection.

It should be noted that the front side and rear side sensor units 11 may always execute marker detection processes. In this case, when the front side sensor unit 11 has detected a magnetic marker 10, a predetermined period may be set in the same manner as the period of detection of FIG. 8, and a final detection result may be determined on the basis of a detection result yielded by the rear side sensor unit 11 during this predetermined period. When the rear side sensor unit 11 had detected a magnetic marker 10 within the predetermined period after the front side sensor unit 11 has detected the magnetic marker 10, a determination may be made that the magnetic marker 10 has been detected.

It should be noted that a threshold (see FIG. 6) as to whether a magnetic marker 10 has been detected may be varied between the front side sensor unit 11 and the rear side sensor unit 11. For example, while the threshold of the front side sensor unit 11 may be loosely set, the threshold of the rear side sensor unit 11 may be strictly set. In this case, missing detection of a magnetic marker 10 by the front side sensor unit 11 can be reduced, and reliability of detection of a magnetic marker 10 by the rear side sensor unit 11 can be secured.

A first lateral shift amount at the time that the front side sensor unit 11 has detected a magnetic marker 10 and a second lateral shift amount at the time that the rear side sensor unit 11 has detected the magnetic marker 10 may be inputted to the detection unit 12. The detection unit 12 may use a variation, which is the difference between the two lateral shift amounts, as one of the indices for finally determining whether the magnetic marker 10 has been detected. For example, if the variation is excessive for the sensor span S (FIG. 2), it is not appropriate to determine that the front side sensor unit 11 and the rear side sensor unit 11 have detected an identical magnetic marker 10 and it is possible to determine that the detection result is low in reliability or that no magnetic marker 10 has been detected yet.

In Embodiment 1, the sensor units 11 are provided in two places in the longitudinal direction of the vehicle. Alternatively, sensor units 11 may be provided in three or more places in the longitudinal direction of the vehicle. As for a combination of any two places having different positions in the longitudinal direction, the magnetic marker detection method according to Embodiment 1 can be applied, and it is also possible to combine plural combinations of two different places. For example, in the case of sensor units in three places, namely the front, the middle, and the rear, in the longitudinal direction, the magnetic marker detection method can be applied to a combination of the front and the rear, a combination of the front and the center, and a combination of the center and the rear. Moreover, a determination as to whether a magnetic marker 10 has been detected can be made by combining three results derived from three types of combination. For example, detection may be determined when all of the three results indicate detection, or whether a magnetic marker 10 has been detected may be determined by means of a majority decision.

Common noise, which is almost uniform magnetic noise, is acting on each magnetic sensor Cn of the sensor units 11 due to sources of magnetism that are large in size such as iron bridges and other vehicles as well as geomagnetism. Such common noise is highly likely to almost uniformly act on each magnetic sensor Cn of the sensor units 11. Accordingly, it is also possible to detect a magnetic marker 10 by using a difference value between magnetic measurement values of the respective magnetic sensors Cn arranged in the vehicle width direction. In this difference value, which represents a gradient of magnetism in the vehicle width direction, the common noise, which almost uniformly acts on each magnetic sensor Cn, is effectively suppressed. In a distribution waveform of the difference value, as depicted in FIG. 9, a zero-cross occurs in correspondence with the position of the magnetic marker 10 in the vehicle width direction, with two alternate mountainous portions with an opposite sign on both sides of the zero-cross.

When the vehicle 5 having the sensor units 11 attached thereto passes over a magnetic marker 10, the amplitude of the two-mountain distribution waveform gradually increases as the vehicle 5 approaches the magnetic marker 10, and becomes a maximum amplitude when the vehicle 5 comes straight above the magnetic marker 10 (period of p4 in FIG. 9). After that, as the vehicle 5 moves away from the magnetic marker 10, the amplitude of the two-mountain distribution waveform gradually decreases. In order to detect a magnetic marker 10 by using such a distribution waveform of a difference value, it is preferable, for example, to apply a threshold judgment regarding the amplitude of two positive and negative mountainous portions on both sides of the zero-cross. In order to find the lateral shift amount, it is preferable to identify the position of the zero-cross. It is also effective to identify the position of the zero-cross with high accuracy by using straight-line approximation or curve approximation.

Instead of the front side sensor unit 11 including fifteen magnetic sensors Cn, a sensor unit including one magnetic sensor may be employed. A magnetic measurement value of this magnetic sensor may be inputted to the detection unit 12, and the detection unit 12 may execute the marker detection process. In this way, the front side magnetic sensor may be used solely to detect the presence or absence of a magnetic marker 10, and the rear side sensor unit 11 may detect the presence or absence of the magnetic marker 10 and a lateral shift amount. In this case, a system configuration can be simplified, and cost can be reduced. It should be noted that such a configuration is also possible that the rear side sensor unit 11 is used solely to detect the presence or absence of a magnetic marker 10 and the front side sensor unit 11 detects the presence or absence of the magnetic marker 10 and a lateral shift amount.

In the marker detection process executed by the front side sensor unit 11 or the rear side sensor unit 11, it is also possible to compute the difference in magnetic measurement value between a magnetic sensor of the front side sensor unit 11 and a magnetic sensor of the rear side sensor unit 11 and detect a magnetic marker 10 by using this computed value. This difference operation makes it possible to generate a magnetic component corresponding to a difference obtained by subtracting a magnetic component detected by the front side magnetic sensor from a magnetic component detected by the rear side magnetic sensor, and is effective in suppressing the common noise or the like. It should be noted that in the difference operation, it is also possible to find the difference between magnetic sensors that are identical in position in the vehicle width direction.

Although Embodiment 1 employs the magnetic sensors Cn having sensitivity in a vertical direction, it is alternatively possible to employ magnetic sensors having sensitivity in the traveling direction or magnetic sensors having sensitivity in the vehicle width direction. Furthermore, it is also possible to employ magnetic sensors having sensitivity for example biaxially in the vehicle width direction and the traveling direction, biaxially in the vehicle width direction and the vertical direction, or biaxially in the traveling direction and the vertical direction, and it is also possible to employ magnetic sensors having sensitivity for example triaxially in the vehicle width direction, the traveling direction, and the vertical direction. Using magnetic sensors having sensitivity in a plurality of axial directions makes it possible to measure the direction of action of magnetism together with the magnitude of magnetism and generate a magnetic vector. It is also possible to use the difference between magnetic vectors and the rate of change in the difference in the traveling direction to distinguish between the magnetism of a magnetic marker 10 and disturbance magnetism.

It should be noted that although Embodiment 1 has illustrated a magnetic marker constituted by a ferrite plastic magnet, a magnetic marker constituted by a ferrite rubber magnet is also preferable.

Embodiment 2

Embodiment 2 is an example of a magnetic marker detection system basing on the configuration of embodiment 1 with a changed method for controlling the sensor units 11. This content is described with reference to the block diagram of FIG. 3 as well as FIG. 10 and FIG. 11.

Operation of the magnetic marker detection system 1 is described with reference to the flow chart of FIG. 10. The detection unit 12 operates the front side sensor unit 11 and the rear side sensor unit 11 to execute marker detection processes in parallel to each other (S201, S211). The detection unit 12 fetches detection results yielded by the respective sensor units 11 (S202) and, as for the detection results yielded by the front sensor unit 11, temporarily stores detection results over a preset storage period (equal to or shorter than several seconds) as time-series data in a storage region (not illustrated) (S203).

When the rear side sensor unit 11 has detected a magnetic marker (S204: YES), the detection unit 12 refers to a history of detection results, included in the time-series data of detection results yielded by the front side sensor unit 11, that correspond to a predetermined period (S205). With reference to a point of time of detection of the magnetic marker by the rear side sensor unit 11, a point of time of possible detection of the same magnetic marker by the front side sensor unit 11 is computed and a period including the computed point of time is set as the predetermined period of reference.

Specifically, as depicted in FIG. 11, the detection unit 12 subtracts, from a time t2 that is a point of time of detection of the magnetic marker by the rear side sensor unit 11, the time required δta obtained by dividing the sensor span S (m) by the vehicle speed (velocity of the vehicle) V (m/s)

measured by the vehicle speed sensor. By thus subtracting the time required δta from the time t2, a time t1 that is a point of time of possible detection of the magnetic marker by the front side sensor unit 11 can be computed. Then, the detection unit 12 sets, as the predetermined period of reference, a time interval whose commencement is a time (t1−δtb) obtained by subtracting, from the time t1, an interval time δtb obtained by dividing a reference distance of 1 (m) by the vehicle speed V (m/s) and whose termination is a time (t1+δtb) obtained by adding the interval time δtb to the time t1.

With reference to the detection results, included in the time-series data of detection results yielded by the front side sensor unit 11, that correspond to the predetermined period, the detection unit 12 determines the presence or absence of a detection result indicating that a magnetic marker has been detected. Then, in a case where a detection result indicating that a magnetic marker has been detected is present (S206: YES), a determination is made that a magnetic marker has been detected (S207), because a magnetic marker detected by the rear side sensor unit 11 was also detected by the front side sensor unit 11.

On the other hand, in a case where a result indicating that a magnetic marker has been detected is absent in the detection results, included in the time-series data of detection results yielded by the front side sensor unit 11, that correspond to the predetermined period (S206: NO), a determination is made that no magnetic marker has been detected yet (S217).

It should be noted that the storage period during which to temporarily store detection results yielded by the front side sensor unit 11 needs only be a period that includes the time required to pass over a distance obtained by adding the reference distance to a distance of approximately 4 to 5 m, which is the length of the vehicle. Of course, since the time required for passage varies according to the vehicle speed, the storage period may be shortened as the vehicle speed becomes higher.

As for the other components and working effects, Embodiment 2 is the same as Embodiment 1.

While the specific examples of the present invention have been described above in detail as in the above embodiments, these specific examples merely describe examples of technologies included in the claims. Needless to say, the claims should not be restrictively construed by the configurations, numerical values, and so forth of the specific examples. The claims include technologies obtained by variously modifying, changing, and combining the specific examples as appropriate by using known technologies, knowledge, and so forth by people skilled in the art.

DESCRIPTION OF SYMBOLS 1 magnetic marker detection system
10 magnetic marker
100 lane
11 sensor unit (marker detection unit)
110 detection process circuit
12 detection unit (determination process part, period setting part)
21 MI element
5 vehicle

The invention claimed is:

1. A magnetic marker detection system for detecting, by using marker detection units provided in at least two places separated from each other in a longitudinal direction of a vehicle, magnetic markers disposed in a traveling path, comprising:
a determination process part that executes a process for, on the basis of at least either a detection result of a magnetic marker yielded by a front side marker detection unit or a detection result of a magnetic marker yielded by a rear side marker detection making a determination as to whether a magnetic marker has been detected,
wherein in the determination process part, detection, within a predetermined period based on a point of time of detection of a magnetic marker by a first one of the front side and rear side marker detection units, of the magnetic marker by a second one of the marker detection units is set as a condition for making a determination that the magnetic marker has been detected.

2. The magnetic marker detection system according to claim 1, further comprising a period setting part that, when the front side marker detection unit has detected a magnetic marker, executes a process for setting, as the predetermined period, a time period including a predicted point of time of detection of the same magnetic marker by the rear side marker detection unit.

3. The magnetic marker detection system according to claim 2, wherein the rear side marker detection unit executes a magnetic marker detection process during the predetermined period.

4. The magnetic marker detection system according to claim 2, wherein either of the front side or rear side marker detection units selectively executes a magnetic marker detection process, and
while the rear side marker detection unit executes a detection process during the predetermined period, the front side marker detection unit executes a detection process during other periods of operation.

5. The magnetic marker detection system according to claim 3, wherein either of the front side or rear side marker detection units selectively executes a magnetic marker detection process, and
while the rear side marker detection unit executes a detection process during the predetermined period, the front side marker detection unit executes a detection process during other periods of operation.

6. The magnetic marker detection system according to claim 1, wherein the predetermined period varies in length according to a vehicle speed that is a velocity of the vehicle, and the predetermined period becomes a shorter period as the vehicle speed becomes higher.

7. The magnetic marker detection system according to claim 2, wherein the predetermined period varies in length according to a vehicle speed that is a velocity of the vehicle, and the predetermined period becomes a shorter period as the vehicle speed becomes higher.

8. The magnetic marker detection system according to claim 3, wherein the predetermined period varies in length according to a vehicle speed that is a velocity of the vehicle, and the predetermined period becomes a shorter period as the vehicle speed becomes higher.

9. The magnetic marker detection system according to claim 4, wherein the predetermined period varies in length according to a vehicle speed that is a velocity of the vehicle, and the predetermined period becomes a shorter period as the vehicle speed becomes higher.

10. The magnetic marker detection system according to claim 5, wherein the predetermined period varies in length according to a vehicle speed that is a velocity of the vehicle, and the predetermined period becomes a shorter period as the vehicle speed becomes higher.

11. The magnetic marker detection system according to claim 1, wherein
- the marker detection units are able to detect lateral shift amounts of the vehicle relative to a magnetic marker, and
- the determination process part is configured to, by using indices regarding a magnetic marker, make a determination as to whether a magnetic marker has been detected, and the indices include a variation that is a difference between a first lateral shift amount detected by the front side marker detection unit and a second lateral shift amount detected by the rear side marker detection unit.

12. The magnetic marker detection system according to claim 2, wherein the marker detection units are able to detect lateral shift amounts of the vehicle relative to a magnetic marker, and
- the determination process part is configured to, by using indices regarding a magnetic marker, make a determination as to whether a magnetic marker has been detected, and the indices include a variation that is a difference between a first lateral shift amount detected by the front side marker detection unit and a second lateral shift amount detected by the rear side marker detection unit.

13. The magnetic marker detection system according to claim 3, wherein the marker detection units are able to detect lateral shift amounts of the vehicle relative to a magnetic marker, and
- the determination process part is configured to, by using indices regarding a magnetic marker, make a determination as to whether a magnetic marker has been detected, and the indices include a variation that is a difference between a first lateral shift amount detected by the front side marker detection unit and a second lateral shift amount detected by the rear side marker detection unit.

14. The magnetic marker detection system according to claim 4, wherein the marker detection units are able to detect lateral shift amounts of the vehicle relative to a magnetic marker, and
- the determination process part is configured to, by using indices regarding a magnetic marker, make a determination as to whether a magnetic marker has been detected, and the indices include a variation that is a difference between a first lateral shift amount detected by the front side marker detection unit and a second lateral shift amount detected by the rear side marker detection unit.

15. The magnetic marker detection system according to claim 5, wherein the marker detection units are able to detect lateral shift amounts of the vehicle relative to a magnetic marker, and
- the determination process part is configured to, by using indices regarding a magnetic marker, make a determination as to whether a magnetic marker has been detected, and the indices include a variation that is a difference between a first lateral shift amount detected by the front side marker detection unit and a second lateral shift amount detected by the rear side marker detection unit.

16. The magnetic marker detection system according to claim 6, wherein the marker detection units are able to detect lateral shift amounts of the vehicle relative to a magnetic marker, and
- the determination process part is configured to, by using indices regarding a magnetic marker, make a determination as to whether a magnetic marker has been detected, and the indices include a variation that is a difference between a first lateral shift amount detected by the front side marker detection unit and a second lateral shift amount detected by the rear side marker detection unit.

17. The magnetic marker detection system according to claim 7, wherein the marker detection units are able to detect lateral shift amounts of the vehicle relative to a magnetic marker, and
- the determination process part is configured to, by using indices regarding a magnetic marker, make a determination as to whether a magnetic marker has been detected, and the indices include a variation that is a difference between a first lateral shift amount detected by the front side marker detection unit and a second lateral shift amount detected by the rear side marker detection unit.

18. The magnetic marker detection system according to claim 8, wherein the marker detection units are able to detect lateral shift amounts of the vehicle relative to a magnetic marker, and
- the determination process part is configured to, by using indices regarding a magnetic marker, make a determination as to whether a magnetic marker has been detected, and the indices include a variation that is a difference between a first lateral shift amount detected by the front side marker detection unit and a second lateral shift amount detected by the rear side marker detection unit.

19. A magnetic marker detection method for detecting, by using marker detection units provided in at least two places separated from each other in a longitudinal direction of a vehicle, magnetic markers disposed in a traveling path, comprising:
- a first detection step in which a front side marker detection unit executes a magnetic marker detection process;
- a period setting step of, when a magnetic marker has been detected by the front side marker detection unit, predicting, on the basis of the point of time of detection, a point of time of possible detection of the same magnetic marker by a rear side marker detection unit and setting a predetermined period including the point of time of possible detection; and
- a second detection step in which the rear side marker detection unit executes a magnetic marker detection process during the predetermined period set in the period setting step.

20. The magnetic marker detection method according to claim 19, wherein the first detection step is repeatedly executed until a magnetic marker is detected by the front side marker detection unit.

* * * * *